US008401379B2

(12) United States Patent
Cho et al.

(10) Patent No.: US 8,401,379 B2
(45) Date of Patent: Mar. 19, 2013

(54) OPTICAL PATH ADJUSTING DEVICE AND PHOTOGRAPHING APPARATUS HAVING THE SAME

(75) Inventors: Woo-jong Cho, Suwon-si (KR); Mun-cheol Choi, Hwaseong-si (KR); Chan-young Moon, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/238,810

(22) Filed: Sep. 21, 2011

(65) Prior Publication Data

US 2012/0121246 A1  May 17, 2012

(30) Foreign Application Priority Data

Nov. 15, 2010 (KR) .................. 10-2010-0113482

(51) Int. Cl.
G03B 35/00 (2006.01)
H04N 13/00 (2006.01)
(52) U.S. Cl. ............................ 396/324; 396/327; 348/42
(58) Field of Classification Search .................. 396/324, 396/327; 348/42
See application file for complete search history.

(56) References Cited

U.S. PATENT DOCUMENTS

| 5,122,650 A | 6/1992 | McKinley |
| 5,294,951 A * | 3/1994 | Lo ................................. 396/323 |
| 5,727,242 A | 3/1998 | Lo et al. |
| 5,802,410 A * | 9/1998 | Wah Lo et al. ................ 396/330 |
| 5,892,994 A | 4/1999 | Inaba |
| 6,115,059 A * | 9/2000 | Son et al. ........................ 348/46 |
| 6,269,223 B1 | 7/2001 | Lo et al. |
| 6,466,746 B2 | 10/2002 | Inaba |
| 6,546,208 B1 | 4/2003 | Costales |
| 7,019,780 B1 * | 3/2006 | Takeuchi et al. .............. 348/340 |
| 7,039,307 B2 * | 5/2006 | Uchida ............................ 396/67 |
| 7,154,527 B1 * | 12/2006 | Goldstein et al. ............... 348/45 |
| 8,068,129 B2 * | 11/2011 | Schechterman et al. ........ 348/42 |
| 2012/0057859 A1 * | 3/2012 | Byon et al. ..................... 396/510 |
| 2012/0076484 A1 * | 3/2012 | Takada et al. ................. 396/324 |

FOREIGN PATENT DOCUMENTS

KR   1020070088876 A   8/2007

OTHER PUBLICATIONS

Search Report established for GB 1118224.3 (Feb. 14, 2012).

* cited by examiner

Primary Examiner — Rodney Fuller
(74) Attorney, Agent, or Firm — Drinker Biddle & Reath LLP

(57) ABSTRACT

An optical path adjusting device includes a supporting plate having a hole through which light travels, a two-dimensional (2D) aperture disposed in the supporting plate so as to adjust an open area of the hole, and a three-dimensional (3D) aperture having a plurality of first blinds and a plurality of second blinds. The plurality of first blinds are disposed to correspond to a first area of the hole so as to move to open or close the first area, and the plurality of second blinds are disposed to correspond to a second area of the hole so as to move to open or close the second area.

10 Claims, 8 Drawing Sheets

OPTICAL PATH ADJUSTING DEVICE AND PHOTOGRAPHING APPARATUS HAVING THE SAME

CROSS-REFERENCE TO RELATED PATENT APPLICATION

This application claims the priority benefit of Korean Patent Application No. 10-2010-0113482, filed on Nov. 15, 2010, in the Korean Intellectual Property Office, the entire disclosure of which is incorporated herein by reference.

BACKGROUND

1. Field of the Invention

Embodiments relate to an optical path adjusting device and a photographing apparatus having the same, and more particularly, to a photographing apparatus capable of selectively photographing a three-dimensional (3D) image and a two-dimensional (2D) image, and an optical path adjusting device for the photographing apparatus.

2. Description of the Related Art

A three-dimensional (3D) image has the stereoscopic effect that is observed by a person when the person looks at an object with their eyes. In the past, the use of 3D images was limited to medical equipment and the like, but recently, many video products using a 3D image are being produced. Also, 3D television technology capable of being supplied to homes is being rapidly developed.

In order to provide a 3D image, it is necessary to simultaneously show images to both eyes of a person, wherein the images are photographed at different angles. Thus, a structure of a 3D image photographing apparatus is different from a structure of a two-dimensional (2D) image photographing apparatus. Due to the fact that the 3D image photographing apparatus has to simultaneously obtain images photographed at different angles, an optical structure or a mechanical structure of the 3D image photographing apparatus is complicated, compared to that of the 2D image photographing apparatus. Also, since a 3D image photographing apparatus may be only able to obtain a 3D image, it is necessary to use a separate camera so as to obtain a 2D image.

SUMMARY

Embodiments can provide a photographing apparatus capable of selectively photographing a three-dimensional (3D) image and a two-dimensional (2D) image, and an optical path adjusting device for the photographing apparatus.

Embodiments can also provide an optical path adjusting device having a compact structure and capable of realizing photographing of a 3D image, and a photographing apparatus having the optical path adjusting device.

Embodiments can also provide an optical path adjusting device having a simple structure, whereby the optical path adjusting device emits less noise and promptly operates when the optical path adjusting device operates for photographing of a 3D image.

According to an embodiment, there is provided an optical path adjusting device. The optical path adjusting device includes a supporting plate having a hole through which light travels; a 2D aperture disposed in the supporting plate so as to adjust an open area of the hole; and a three-dimensional 3D aperture having a plurality of first blinds and a plurality of second blinds, wherein the plurality of first blinds are disposed to correspond to a first area of the hole so as to move to open or close the first area, and the plurality of second blinds are disposed to correspond to a second area of the hole so as to move to open or close the second area.

The optical path adjusting device may further include a 2D driving unit connected to the 2D aperture so as to drive the 2D aperture and a 3D driving unit connected to the 3D aperture so as to drive the plurality of first blinds and the plurality of second blinds.

The optical path adjusting device may further include a control unit that applies a control signal to the 2D driving unit and the 3D driving unit, wherein, in a 2D photographing mode for photographing a 2D image, the control unit controls the plurality of first blinds and the plurality of second blinds to open the first area and the second area and controls the 2D aperture to adjust the open area of the hole, and in a 3D image photographing mode for photographing a 3D image, the control unit controls the 2D aperture to open the hole and controls the plurality of first blinds and the plurality of second blinds to be alternately opened and closed.

The plurality of first blinds and the plurality of second blinds may be substantially parallel to each other and may be separate from each other.

The optical path adjusting device may further include a frame that is arranged at an outer side of the plurality of first blinds and the plurality of second blinds and that supports the plurality of first blinds and the plurality of second blinds in a manner that allows the plurality of first blinds and the plurality of second blinds to be movable.

The 3D driving unit may include a driving power generating unit that generates a driving power so as to drive the plurality of first blinds and the plurality of second blinds and a driving power delivering unit that delivers the driving power of the driving power generating unit to the plurality of first blinds and the plurality of second blinds.

The driving power delivering unit may include a gear assembly mated with the plurality of first blinds and the plurality of second blinds.

The driving power delivering unit may include a linkage rotatably mated with the plurality of first blinds and the plurality of second blinds.

The driving power generating unit may generate a magnetic force by being driven when an electrical signal is applied, and the driving power delivering unit may be magnetic and may be mated with the plurality of first blinds and the plurality of second blinds, whereby the driving power delivering unit delivers a rotation power to the plurality of first blinds and the plurality of second blinds due to the magnetic force of the driving power generating unit.

According to another embodiment, there is provided a photographing apparatus. The photographing apparatus includes an optical path adjusting device that has a supporting plate having a hole through which light passes, a 2D aperture disposed in the supporting plate so as to adjust an open area of the hole, and a 3D aperture having a plurality of first blinds and a plurality of second blinds, wherein the plurality of first blinds are disposed to correspond to a first area of the hole so as to move to open or close the first area, and the plurality of second blinds are disposed to correspond to a second area of the hole so as to move to open or close the second area; an imaging device that converts light passed through the optical path adjusting device into an electrical signal; and a control unit that performs photographing by controlling the imaging device and the optical path adjusting device and selects and performs one of a 2D photographing mode and a 3D photographing mode. In the 2D photographing mode, the control unit performs photographing by controlling the optical path adjusting device to open the plurality of first blinds and the plurality of second blinds of the 3D aperture and then to adjust an open area of the 2D aperture, and in the 3D photographing mode, the control unit obtains two images by controlling the optical path adjusting device to maximally open the 2D aperture and alternately open and close the plurality of first blinds and the plurality of second blinds.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, embodiments will be described in detail by explaining exemplary embodiments of an optical path adjusting device and a photographing apparatus having the same with reference to the attached drawings.

Figure 1:
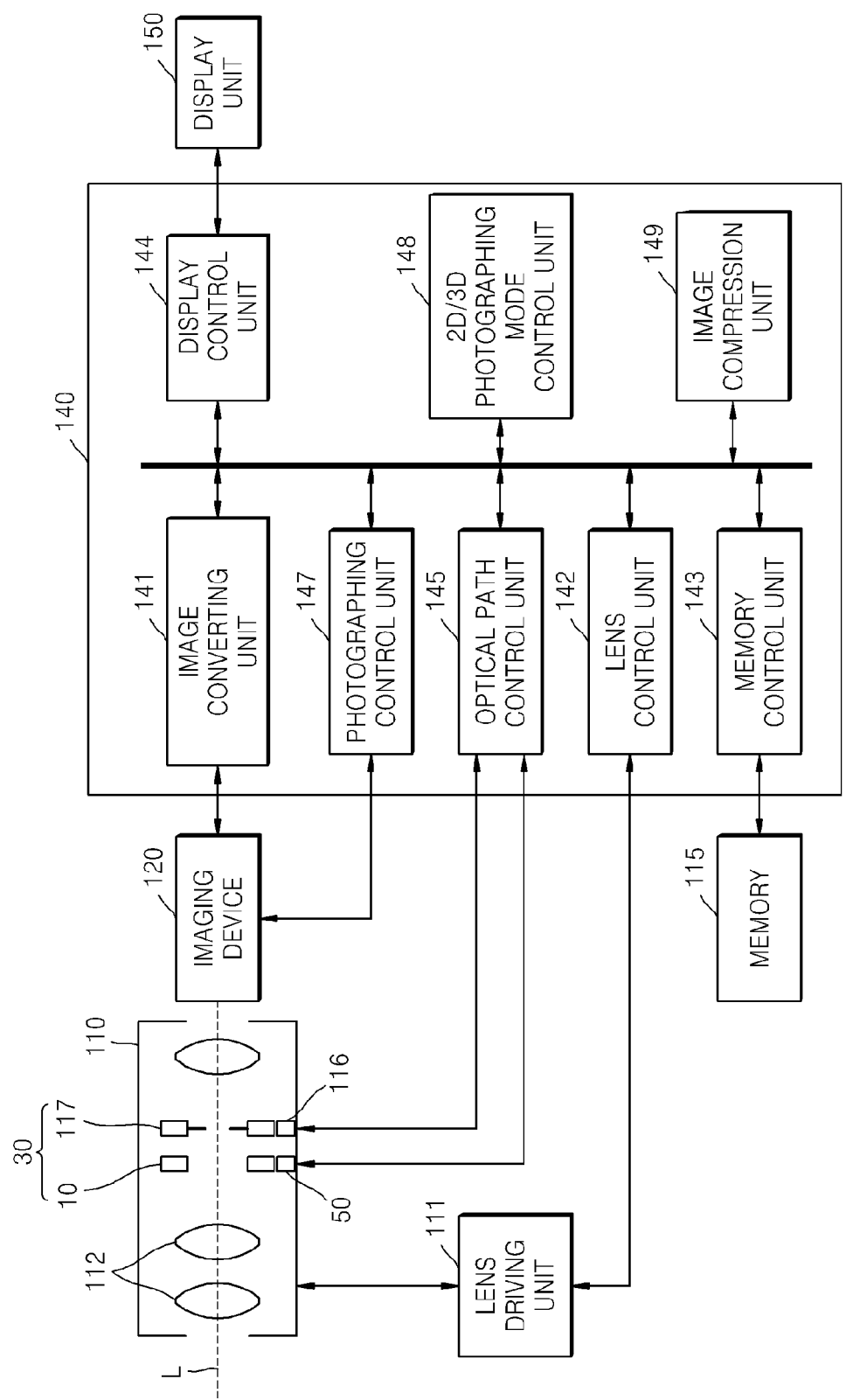
FIG. 1 is a schematic diagram of a photographing apparatus having an optical path adjusting device according to an embodiment.

FIG. 1 is a schematic diagram of a photographing apparatus having an optical path adjusting device 30 according to an embodiment.

Referring to FIG. 1, the photographing apparatus can include the optical path adjusting device 30, an imaging device 120 that can convert light that passes through the optical path adjusting device 30 into an electrical signal, and a control unit 140 that can select and can execute one of a two-dimensional (2D) image photographing mode and a 3D image photographing mode by controlling the imaging device 120.

The optical path adjusting device 30 can be disposed on an optical path of light that passes through a plurality of lenses 112 and then is incident on the imaging device 120. The optical path adjusting device 30 may completely open the optical path or may partially block the light by blocking a portion of the optical path. The imaging device 120 may photograph a 2D image or a 3D image, in conjunction with operations of the optical path adjusting device 30.

The photographing apparatus according to one or more embodiments may be embodied in various forms including a digital still camera for photographing a still image, a digital video camera for photographing a moving picture, and the like.

The imaging device 120 can photograph an image of a target object and can convert the image into an electrical signal. The electrical signal generated by the imaging device 120 can be converted into image data by an image converting unit 141. A photographing control unit 147 of the control unit 140 can perform a photographing operation by controlling the imaging device 120.

The lenses 112 and the optical path adjusting device 30 can form an optical system that can be arranged in a barrel 110 and can be disposed in front of the imaging device 120. The lenses 112 and the optical path adjusting device 30 can function to allow external image light to be formed on an imaging surface of the imaging device 120.

The lenses 112 can be disposed in a manner that allows a distance therebetween to be changed. When the distance between the lenses 112 is changed, a zoom magnification or a focus may be adjusted. The lenses 112 can be disposed along an optical axis L, and in this regard, the optical axis L can indicate a virtual straight line that can connect optical center points of the lenses 112.

Positions of the lenses 112 may be changed with respect to each other by using a lens driving unit 111 that can have a driving means such as a zoom motor (not shown) to drive the lenses 112. The lenses 112 may include a zoom lens that can magnify or can reduce a size of a target object, a focus lens that can adjust a focus on the target object, and the like.

The lens driving unit 111 can operate by receiving a control signal from a lens control unit 142 of the control unit 140 and then can drive the lenses 112 to various positions so as to allow the lenses 112 to have one of a plurality of zoom magnifications.

The imaging device 120 can include a photoelectric conversion device, such as a charge coupled device (CCD) or a complementary metal oxide semiconductor (CMOS), and can convert incident image light passed through the optical path adjusting device 30 into an electrical signal. The imaging device 120 can be driven by receiving a control signal from the photographing control unit 147.

The image converting unit 141 can convert the electrical signal of the imaging device 120 into image data. An image processing operation can be performed on the image data, or the image data can be stored in a storage medium including a memory 115. For example, the image converting unit 141 may convert the electrical signal of the imaging device 120 into RGB data and then may convert the RGB data into raw data in the form of a YUV signal that can include a brightness (Y) signal and chrominance (UV) signals.

Also, the electrical signal of the imaging device 120 may be converted by the image converting unit 141 via a procedure in which driving noise included in the electrical signal of the imaging device 120 can be decreased by using a correlated double sampling (CDS) circuit. A gain of the electrical signal can be adjusted by using an automatic gain control (AGC) circuit after the driving noise of the electrical signal is decreased. An analog signal can be converted into a digital signal by using an analog-to-digital (A/D) converter. Several signal processing operations that can include pixel defect compensation, gain compensation, white balance compensation, and gamma compensation can be performed on the digital signal. The CDS circuit, the AGC circuit, and the A/D converter may be configured as separate circuits.

The control unit 140 can be electrically connected to the imaging device 120, the lens driving unit 111, a display unit 150, the optical path adjusting device 30, the memory 115, and the like. The control unit 140 can function to exchange a control signal with the aforementioned components or to process data. The control unit 140 can include the image converting unit 141, the lens control unit 142, a memory control unit 143, a display control unit 144, an optical path control unit 145, the photographing control unit 147, a 2D/3D photographing mode control unit 148, and an image compression unit 149.

The control unit 140 may be embodied as a microchip or a circuit board including a microchip, and the components that can be included in the control unit 140 may be implemented by software or circuits that are embedded in the control unit 140.

The memory control unit 143 can control data to be recorded to the memory 115 and can control reading of the recorded data or reading of setting information.

The memory 115 may be a volatile internal memory, and for example, the memory 115 may be formed of a semiconductor memory device including a synchronous dynamic random access memory (SDRAM) or the like. The memory 115 may function as a buffer memory and as an operational memory. The buffer memory can temporarily store the image data generated by the image converting unit 141, and the operational memory can be used to perform a data processing operation.

Also, the memory 115 may be a non-volatile external memory, e.g., a memory stick, a flash memory including a secure digital (SD) card or a multimedia card (MMC), a storage device including a hard disk drive (HDD), or an optical storage device including a digital versatile disk (DVD) or a compact disc (CD). The memory 115 may store compressed and converted image data in the form of a Joint Photographic Experts Group (JPEG) file, a Tagged-Image file Format (TIF) file, a Graphics Interchange Format (GIF) file, a Personal Computer eXchange (PCX) file, or the like.

The photographing apparatus may include the display unit 150 that can display an image of the image data. The display unit 150 may be embodied as a touch screen that can detect a touch on a surface and can generate a signal corresponding to a position corresponding to the detected touch by using a display device including a liquid crystal display (LCD), an organic light emitting device (OLED), or the like.

The 2D/3D photographing mode control unit 148 can set whether the photographing apparatus operates in the 2D photographing mode that can obtain a 2D image or in the 3D photographing mode that can obtain a 3D image. According to the set photographing mode, operations of the optical path control unit 145 and the photographing control unit 147 may be changed.

The optical path adjusting device 30 can include a 2D aperture 117 and a 3D aperture 10 that can be arranged on the optical path in the barrel 110 so as to adjust an amount of light. The 2D aperture 117 can be driven by a 2D driving unit 116 that can operate by receiving a control signal from the optical path control unit 145. The 3D aperture 10 can be driven by a 3D driving unit 50.

Figure 2:
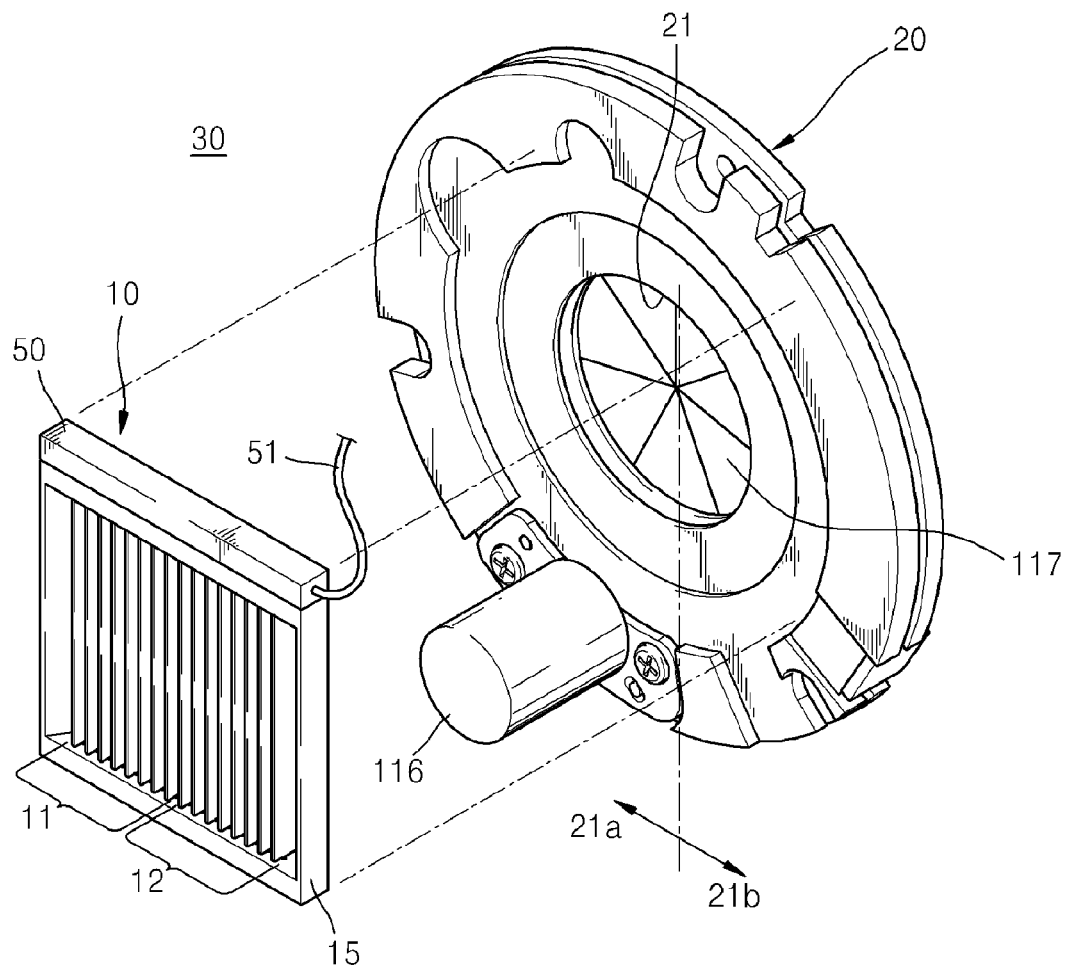
FIG. 2 is an exploded perspective view of components in the optical path adjusting device of FIG. 1.
Figure 3:
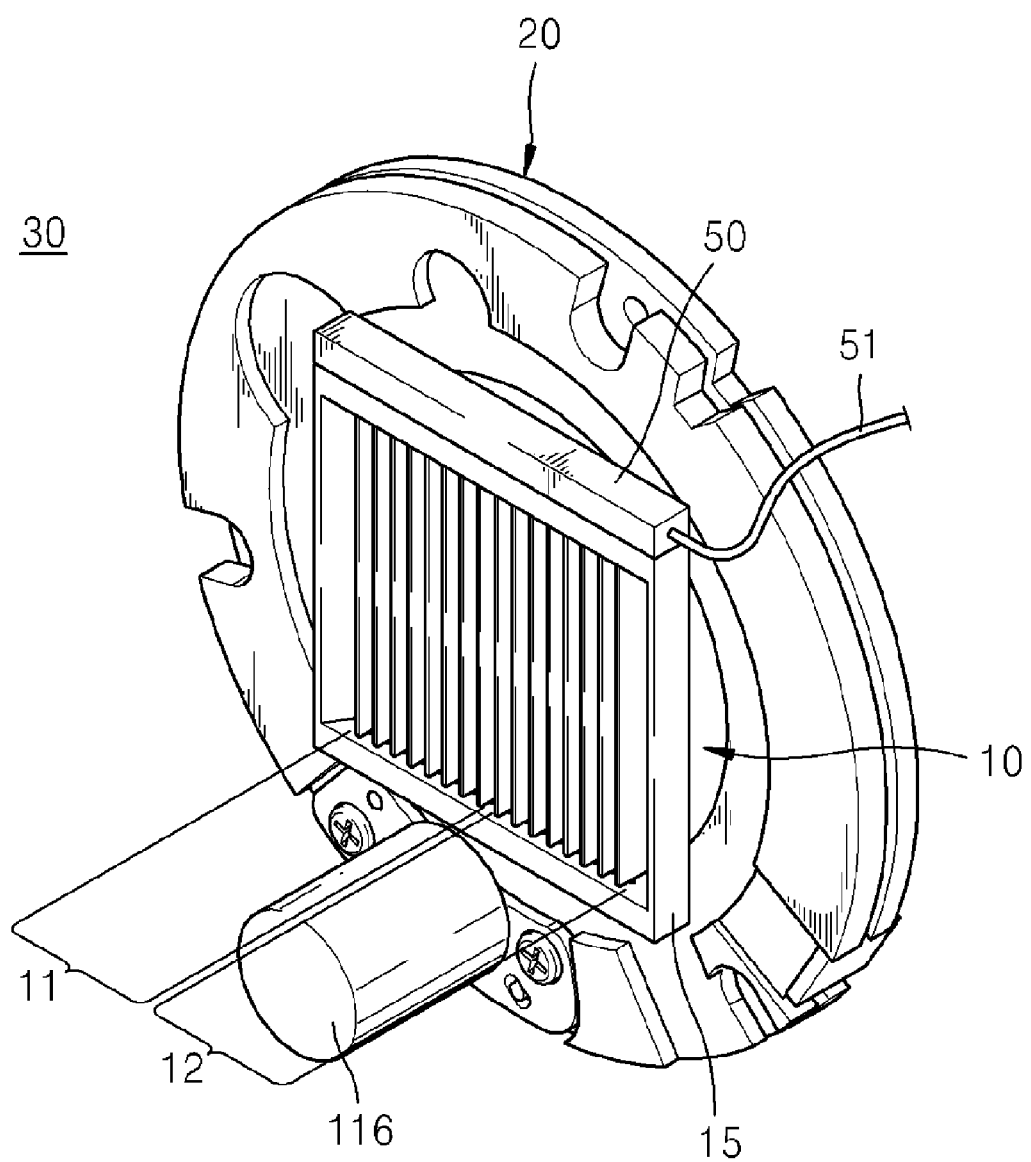
FIG. 3 is a perspective view of the optical path adjusting device of FIG. 2.

FIG. 2 is an exploded perspective view of components in the optical path adjusting device 30 of FIG. 1. FIG. 3 is a perspective view of the optical path adjusting device 30 of FIG. 2 in an assembled state.

The optical path adjusting device 30 of FIGS. 2 and 3 can include a supporting plate 20 that can have a hole 21 through which light passes, the 2D aperture 117 that can be disposed in the supporting plate 20 so as to adjust an open area of the hole 21, and the 3D aperture 10 that can close or open a partial area of the hole 21 by defining the partial area so as to make 3D photographing possible.

The supporting plate 20 can function as a supporting structure that supports other components by being fixed in the barrel 110 of the photographing apparatus as illustrated in FIG. 1. The hole 21 can function as an optical path that can guide light that passes through the lenses 112 of FIG. 1, so as to allow the light to be formed on the imaging device 120.

The 2D aperture 117 can be disposed in the supporting plate 20 so as to adjust the open area of the hole 21 by moving toward a center of the hole 21 or moving toward an edge of the hole 21. Also, the 2D driving unit 116 for driving the 2D aperture 117 can be disposed in the supporting plate 20. For example, a stepping motor may be used as the 2D driving unit 116. The 2D driving unit 116 may be electrically connected to a flexible circuit board (FCB) (not shown), so that the 2D driving unit 116 may be controlled by the optical path control unit 145 of FIG. 1.

The 3D aperture 10 can be disposed on a surface of the supporting plate 20. The 3D aperture 10 can include a plurality of first blinds 11 and a plurality of second blinds 12, wherein the first blinds 11 can be rotatably disposed to correspond to a first area 21a of the hole 21 to open or close the first area 21a, and the second blinds 12 can be rotatably disposed to correspond to a second area 21b of the hole 21 to open or close the second area 21b.

The first blinds 11 and the second blinds 12 can be disposed over the first area 21a and the second area 21b, respectively. When each of the first blinds 11 and each of the second blinds 12 rotate, they may not deviate from the hole 21 and can maintain their positions over the first area 21a and the second area 21b. Thus, as the first blinds 11 and the second blinds 12 rotate, the first area 21a and the second area 21b may be opened or closed.

A frame 15 can be arranged at an outer side of the first blinds 11 and the second blinds 12. The frame 15 can support the first blinds 11 and the second blinds 12 in a manner such that the first blinds 11 and the second blinds 12 are rotatable. The first blinds 11 and the second blinds 12 can be parallel to each other and can separate from each other.

The optical path adjusting device 30 can drive the 3D driving unit 50 that may be connected to the 3D aperture 10 and can drive the first blinds 11 and the second blinds 12. The 3D driving unit 50 can operate by receiving a control signal from the control unit 140.

Figure 4:
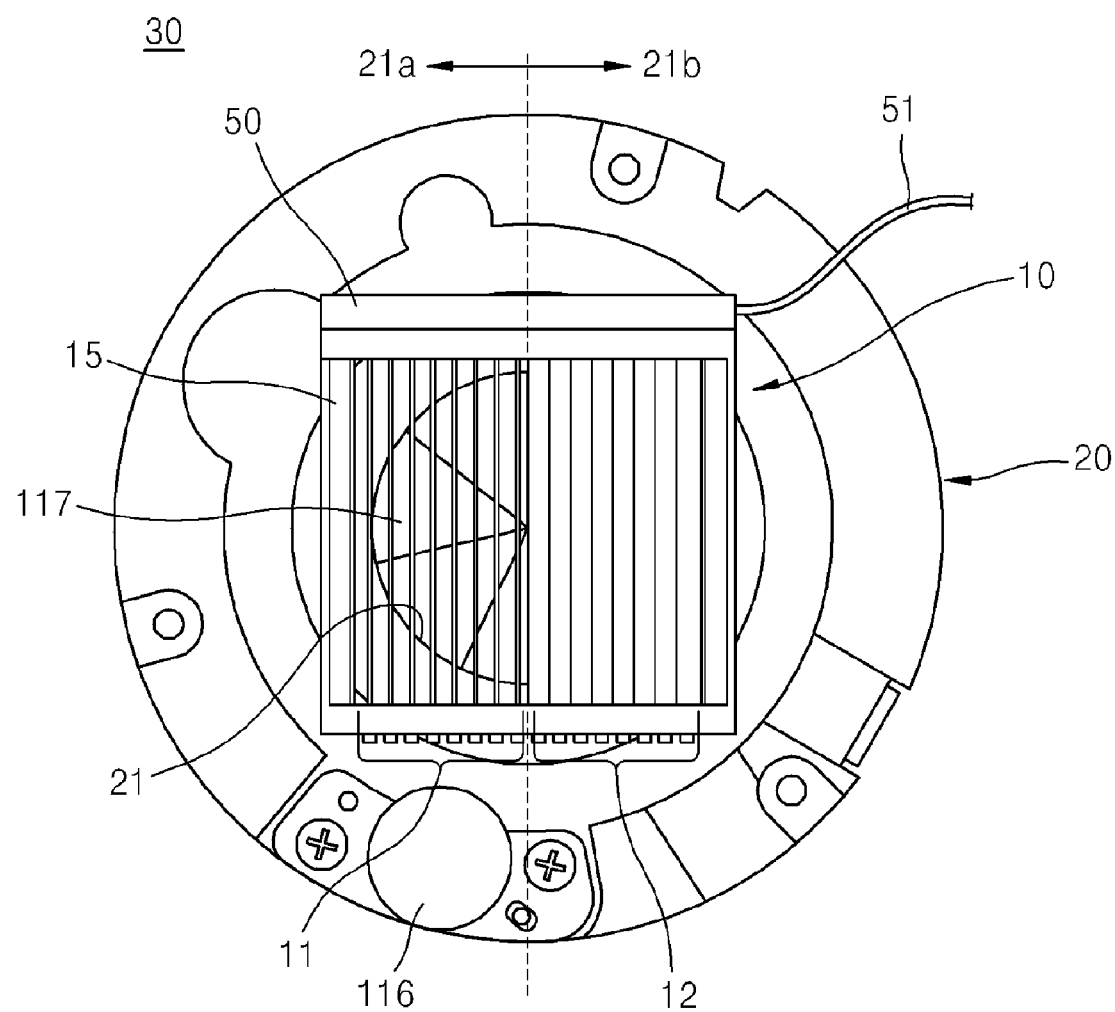
FIG. 4 is a front view of the optical path adjusting device of FIG. 3 performing a portion of a three-dimensional (3D) photographing operation.
Figure 5:
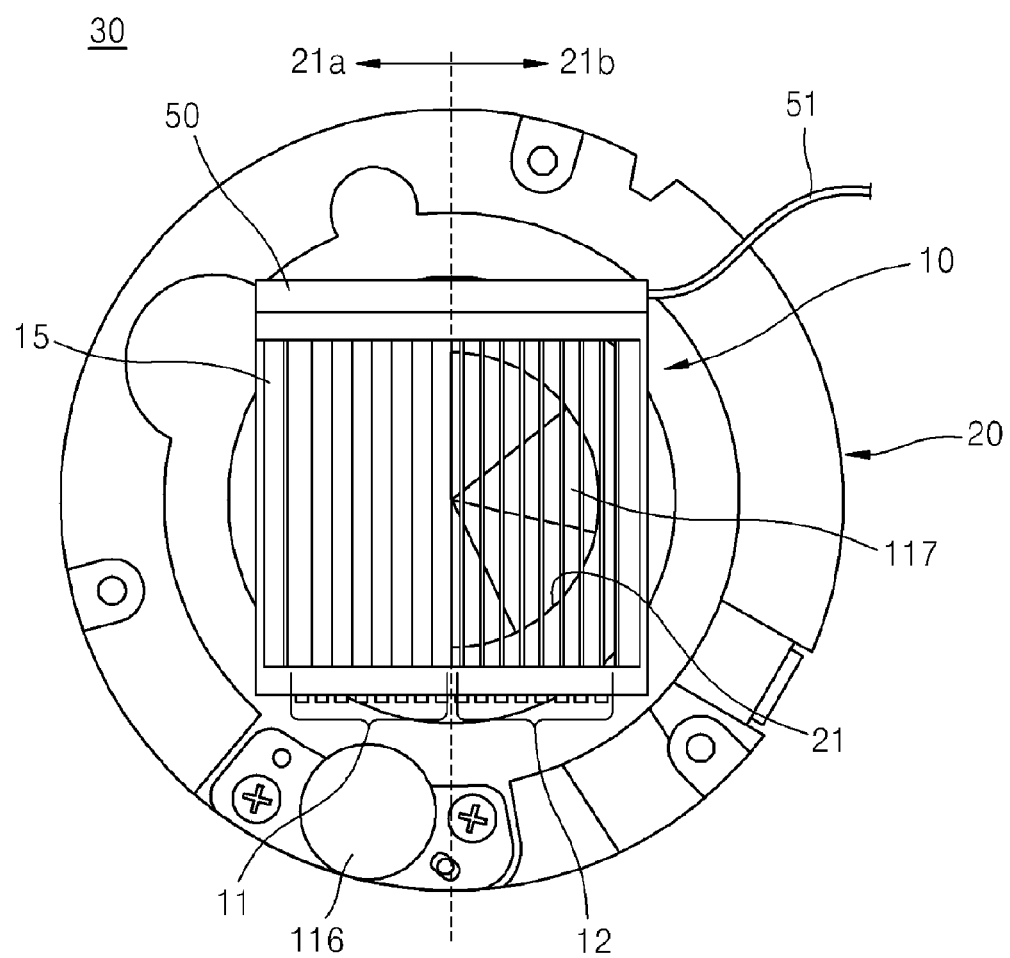
FIG. 5 is a front view of the optical path adjusting device of FIG. 3 performing another portion of the 3D photographing operation.

FIG. 4 is a front view of the optical path adjusting device 30 of FIG. 3 performing a portion of a 3D photographing operation. FIG. 5 is a front view of the optical path adjusting device 30 of FIG. 3 performing another portion of the 3D photographing operation.

In the 2D photographing mode that can perform the 2D photographing operation, all of the first blinds 11 and the second blinds 12 of the 3D aperture 10 can open the hole 21, and the 2D aperture 117 can adjust the open area of the hole 21. Light passed through the first blinds 11 and the second blinds 12 can pass through the hole 21 via the 2D aperture 117 and then can be incident on the imaging device 120 of FIG. 1. At this time, it can be possible to obtain a 2D image by driving the imaging device 120.

In the 3D photographing mode that can perform the 3D photographing operation, the 2D aperture 117 can move toward the edge of the hole 21 and thus can completely open the hole 21. Also, the first blinds 11 and the second blinds 12 of the 3D aperture 10 can function to alternately open and close the hole 21. That is, when the first blinds 11 open the first area 21a of the hole 21, the second blinds 12 can close the second area 21b of the hole 21. Also, when the first blinds 11 close the first area 21a of the hole 21, the second blinds 12 can open the second area 21b of the hole 21.

It can be possible to obtain a first image by performing photographing when the first blinds 11 open the first area 21a and to obtain a second image by performing photographing when the second blinds 12 open the second area 21b.

In general, in order to obtain a 3D image, it can be necessary to obtain two images having a phase difference. From among methods of obtaining two images having a phase difference, there is a method in which a screen can move to partially block an optical path. However, this method can have a problem because of the increased size of a driving motor that moves the screen onto the optical path to partially block the optical path and that moves the screen toward an edge of the optical path. When continuous photographing is performed or a 3D moving picture is photographed, the screen has to move at a high speed such that noise therefrom can sharply increase.

Figure 6:
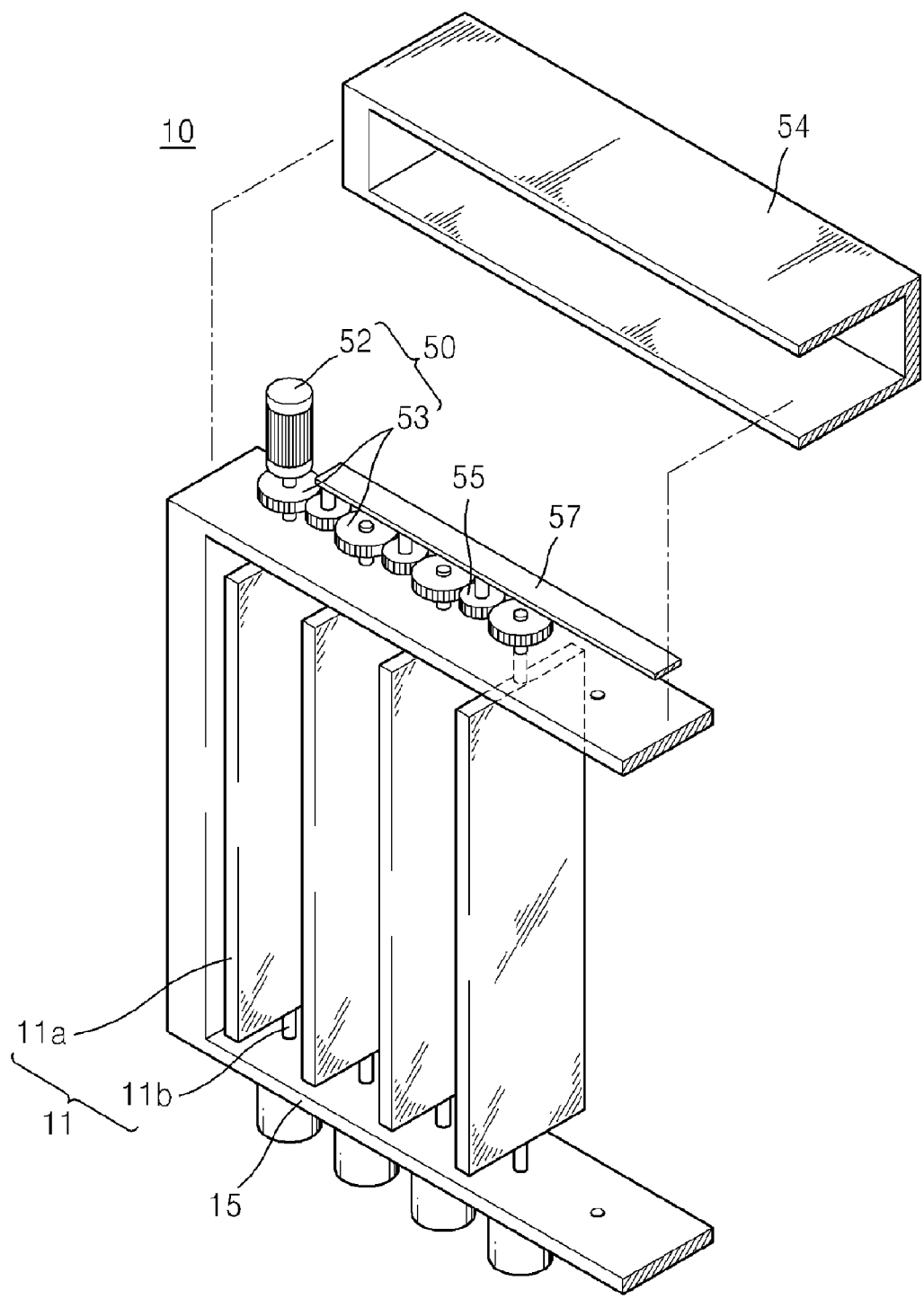
FIG. 6 is an exploded perspective view of a 3D aperture of the optical path adjusting device in FIG. 2, according to an embodiment.

FIG. 6 is an exploded perspective view of the 3D aperture 10 of the optical path adjusting device 30 in FIG. 2, according to an embodiment.

Each of the first blinds 11 can have a blocking plate 11a that can be capable of blocking light and a rotation axis 11b that can vertically project from the blocking plate 11a and can be rotatably mounted on the frame 15. Since the second blinds 12 included in the 3D aperture 10 can have the same configuration as the first blinds 11, FIG. 6 omits the second blinds 12 for the sake of clarity.

The 3D driving unit 50, which can drive the first blinds 11, can include a driving power generating unit 52 that can generate a driving power and a driving power delivering unit 53 that can deliver the driving power of the driving power generating unit 52 to the first blinds 11.

In FIG. 6, the driving power generating unit 52 is embodied as a stepping motor, and the driving power delivering unit 53 is embodied as a gear assembly coupled with the rotation axis 11b of each first blind 11.

However, the driving power generating unit 52 and the driving power delivering unit 53 are not limited to the examples shown in FIG. 6, and thus may be embodied by using various types of mechanical elements. For example, the driving power generating unit 52 may be an electromagnet that can generate a magnetic force by being driven when an electrical signal is applied, and the driving power delivering unit 53 may be a permanent magnet that can be combined with the rotation axis 11b of each first blind 11.

Also, the driving power generating unit 52 may be a piezoelectric actuator that can generate reciprocating linear motion by using a piezoelectric element, and the driving power delivering unit 53 may be an assembly of a linkage and a gear array that can convert the reciprocating linear motion into a rotational motion of the rotation axis 11b.

In FIG. 6, an intermediate gear 55 that can be rotatably coupled with a support beam 57 can be disposed between one or more driving power delivering units 53 that are coupled with the rotation axes 11b of the first blinds 11. The intermediate gear 55 can function to allow a driving power generated by the driving power generating unit 52 to be delivered to adjacent first blinds 11.

A case 54 can be arranged on the frame 15 so as to cover various components of the 3D driving unit 50. FIG. 6 does not illustrate a 3D driving unit that can drive the second blinds 12 shown in FIGS. 2 through 5. The first blinds 11 and the second blinds 12 may have to alternately perform opening and closing operations. Thus, in order to drive the second blinds 12, a driving unit that can have the same configuration as the 3D driving unit 50 of the first blinds 11 in FIG. 6 may have to be coupled with the second blinds 12.

By using the photographing apparatus having the optical path adjusting device 30 according to the embodiment of FIGS. 1 through 6, the first blinds 11 and the second blinds 12 can rotate without deviating from their positions, so that the first area 21a and the second area 21b of the hole 21 may be sequentially opened and closed. By doing so, while a size of a driving means is reduced, the first area 21a and the second area 21b may be sequentially and promptly opened and closed for 3D photographing.

Also, in the 3D photographing mode, the first blinds 11 and the second blinds 12 can rotate at their original positions without moving toward the edge of the hole 21, and thus noise generated can be significantly reduced.

Figure 7:
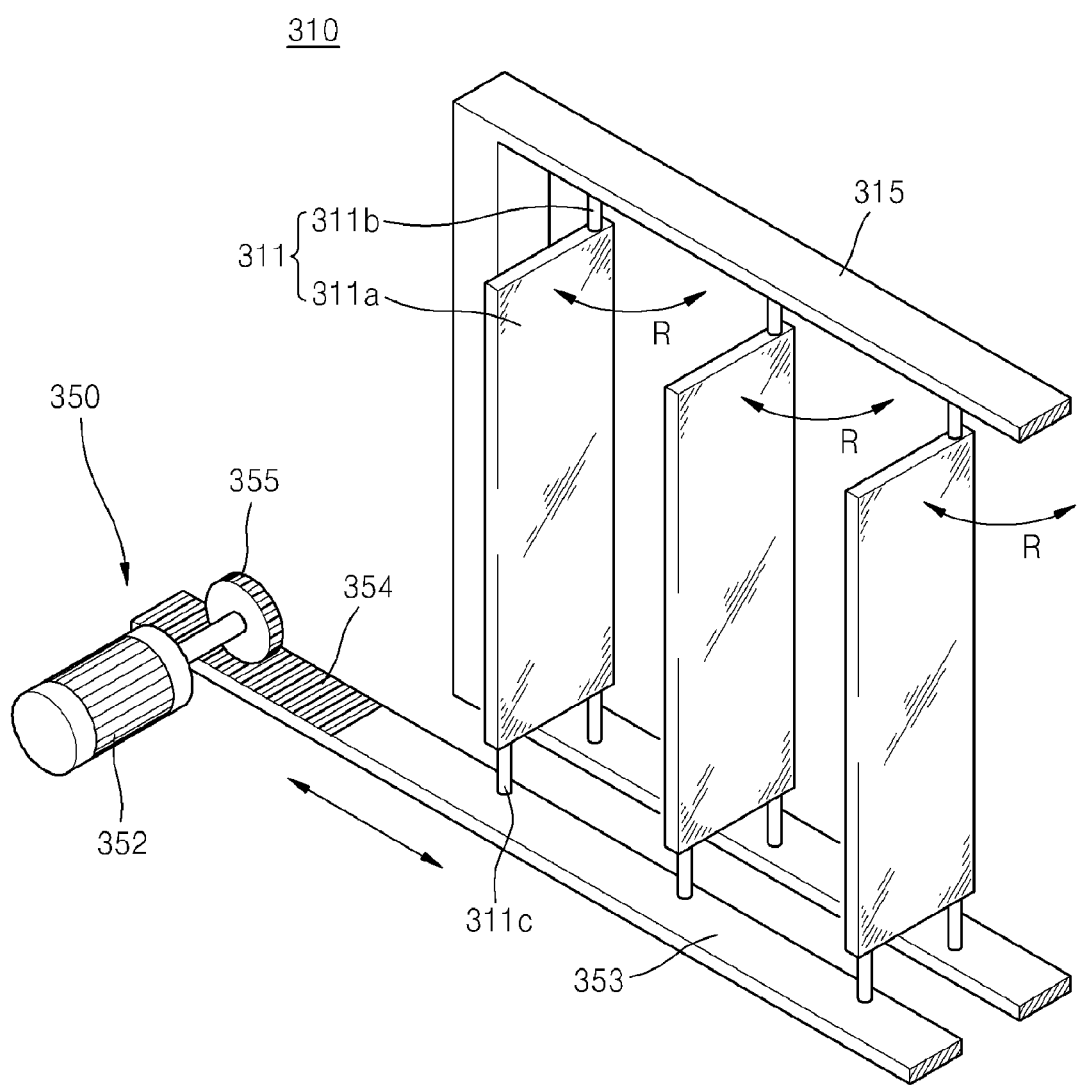
FIG. 7 is an exploded perspective view of a 3D aperture of an optical path adjusting device according to another embodiment.

FIG. 7 is an exploded perspective view of a 3D aperture 310 of an optical path adjusting device according to another embodiment.

Each of first blinds 311 of the 3D aperture 310 can have a blocking plate 311a that can be capable of blocking light and a rotation axis 311b that can vertically project from the blocking plate 311a and can be rotatably mounted on a frame 315. Since second blinds 312 included in the 3D aperture 310 can have the same configuration as the first blinds 311, FIG. 7 omits the second blinds 312 for the sake of clarity.

A 3D driving unit 350 that can drive the first blinds 311 can include a driving power generating unit 352 that can generate a driving power and a driving power delivering unit 353 that can deliver the driving power of the driving power generating unit 352 to the first blinds 311.

In FIG. 7, the driving power generating unit 352 is embodied as a stepping motor, and the driving power delivering unit 353 is embodied as a linkage combined with levers 311c of the first blinds 311. The levers 311c of the first blinds 311 can be rotatably combined with the driving power delivering unit 353.

A rack gear 354 can be arranged on a surface near an end of the driving power delivering unit 353, and a driving gear 355 that can be rotated by the driving power generating unit 352 can be engaged with the rack gear 354. Thus, a driving power of the driving power generating unit 352 can be delivered to the driving power delivering unit 353 via the driving gear 355 and the rack gear 354. When the driving power is generated by the driving power generating unit 352, the first blinds 311, that can be rotatably combined with the driving power delivering unit 353, may rotate as indicated by an arrow R.

Figure 8:
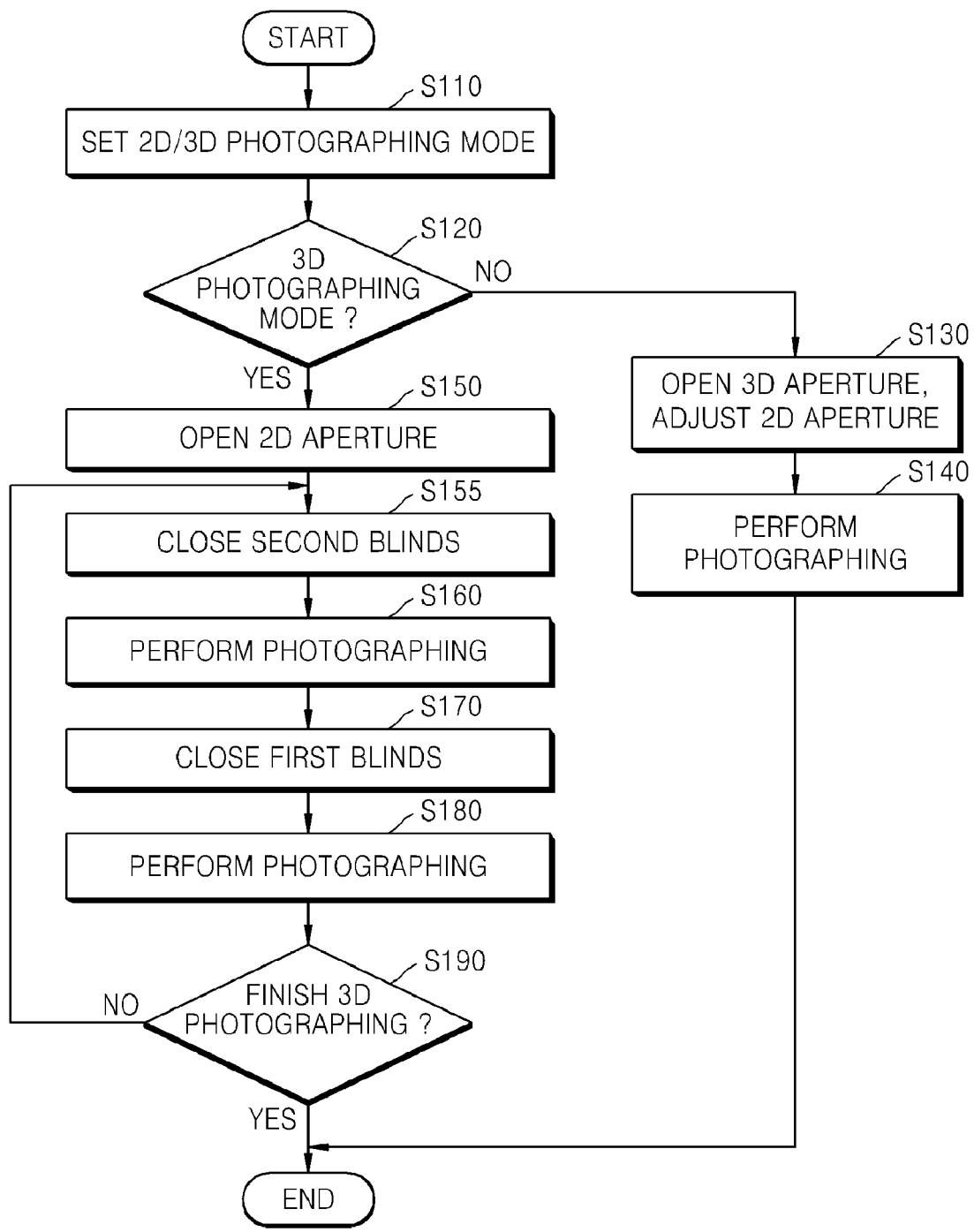
FIG. 8 is a flowchart of photographing operations performed by the photographing apparatus of FIG. 1, according to an embodiment.

FIG. 8 is a flowchart of photographing operations performed by the photographing apparatus of FIG. 1, according to an embodiment.

According to the photographing operations of FIG. 8, it is possible to selectively execute a 2D photographing mode or a 3D photographing mode by using one photographing apparatus.

First, 2D/3D photographing mode setting operation S110 can be performed so as to set in advance whether to perform a 2D photographing mode or a 3D photographing mode. When shutter manipulation for photographing is performed, operation S120 can be performed so as to check whether the 3D photographing mode was set in 2D/3D photographing mode setting operation S110.

When the 2D photographing mode is set, the first blinds 11 and the second blinds 12 of the 3D aperture 10 of FIG. 4 can open the hole 21, and the 2D aperture 117 can be controlled to adjust an open area of the hole 21 (operation S130). Afterward, a photographing operation can be performed so as to obtain a 2D image (operation S140). The open area of the hole 21 can be determined according to a brightness of a target object to be photographed.

When the 3D photographing mode is set, the 2D aperture 117 can open the hole 21 (operation S150). Afterward, as illustrated in FIG. 4, the second blinds 12 can be closed, and the first blinds 11 can be opened so as to allow light to pass through only the first area 21a of the hole 21 (operation S155). Then, a first image can be photographed by using the light passing through the first area 21*a* (operation S160). Next, the first blinds 11 can be closed and the second blinds 12 can be opened so as to allow light to pass through only the second area 21*b* (operation S170), as illustrated in FIG. 5. Then, a second image can be photographed by using the light passing through the second area 21*b* (operation S180).

The photographing operations of FIG. 8 are not limited to the aforementioned order of closing and opening the first blinds 11 and the second blinds 12, and thus the first blinds 11 may be closed first and then the second blinds 12 may be closed second.

It is checked whether the 3D photographing mode is finished (operation S190), and if the 3D photographing mode is maintained, next 3D photographing may be conducted by performing operations S155 through S180 again. The repeat of 3D photographing may be applied to both still image photographing and moving picture photographing.

By using the first image and the second image obtained by using the aforementioned method, a 3D image may be realized.

According to the one or more embodiments, the optical path adjusting device and the photographing apparatus having the same may selectively photograph a 2D image and a 3D image by controlling the 3D aperture and the 2D aperture.

Also, 3D photographing may be performed in a manner in which the first and second blinds having a light weight rotate without deviating from their positions. Thus, a size of a driving means can be reduced, and an operation of the 3D aperture for 3D photographing may be promptly performed.

Also, in the 3D photographing mode, the first blinds and the second blinds rotate at their original positions without moving toward the edge of the hole, so that generated noise can be significantly reduced.

The one or more embodiments may include a processor, a memory for storing and executing program data, a permanent storage including a disk drive, a communication port for communication with an external device, a user interface device including a touch panel, a key, a button, and the like. The methods embodied as a software module or an algorithm may be stored as computer readable codes or program commands that are executable on the processor in a computer readable recording medium. The computer readable recording medium is any data storage device that can store data which can be thereafter read by a computer system. Examples of the computer readable recording medium include non-transitory computer-readable media, random-access memory (RAM), read-only memory (ROM), CD-ROMs, DVDs, magnetic tapes, hard disks, floppy disks, and optical data storage devices. The computer-readable recording medium can also be distributed over network-coupled computer systems so that the computer-readable code is stored and executed in a distributed fashion. The media can be read by computers, can be stored in the memory, and can be executed on the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc. Also, using the disclosure herein, programmers of ordinary skill in the art to which the invention pertains can easily implement functional programs, codes, and code segments for making and using the invention.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural, unless the context clearly indicates otherwise. It will also be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention. Therefore, the scope of the invention is defined not by the detailed description of the invention but by the following claims, and all differences within the scope will be construed as being included in the invention.

What is claimed is:

1. An optical path adjusting device comprising:
   a supporting plate having a hole through which light travels;
   a two-dimensional (2D) aperture disposed in the supporting plate so as to adjust an open area of the hole; and
   a three-dimensional (3D) aperture having a plurality of first blinds and a plurality of second blinds, wherein the plurality of first blinds are disposed to correspond to a first area of the hole so as to move to open or close the first area, and the plurality of second blinds are disposed to correspond to a second area of the hole so as to move to open or close the second area.

2. The optical path adjusting device of claim 1, further comprising:
   a 2D driving unit connected to the 2D aperture so as to drive the 2D aperture; and
   a 3D driving unit connected to the 3D aperture so as to drive the plurality of first blinds and the plurality of second blinds.

3. The optical path adjusting device of claim 2, further comprising a control unit that applies a control signal to the 2D driving unit and the 3D driving unit, wherein, in a 2D photographing mode for photographing a 2D image, the control unit controls the plurality of first blinds and the plurality of second blinds to open the first area and the second area and controls the 2D aperture to adjust the open area of the hole, and in a 3D image photographing mode for photographing a 3D image, the control unit controls the 2D aperture to open the hole and controls the plurality of first blinds and the plurality of second blinds to be alternately opened and closed.

4. The optical path adjusting device of claim 1, wherein the plurality of first blinds and the plurality of second blinds are substantially parallel to each other and are separate from each other.

5. The optical path adjusting device of claim 1, further comprising a frame that is arranged at an outer side of the plurality of first blinds and the plurality of second blinds and that supports the plurality of first blinds and the plurality of second blinds in a manner that allows the plurality of first blinds and the plurality of second blinds to be movable.

6. The optical path adjusting device of claim 1, wherein the 3D driving unit comprises a driving power generating unit that generates a driving power so as to drive the plurality of first blinds and the plurality of second blinds; and a driving power delivering unit that delivers the driving power of the driving power generating unit to the plurality of first blinds and the plurality of second blinds.

7. The optical path adjusting device of claim 6, wherein the driving power delivering unit comprises a gear assembly coupled with the plurality of first blinds and the plurality of second blinds.

8. The optical path adjusting device of claim 6, wherein the driving power delivering unit comprises a linkage rotatably coupled with the plurality of first blinds and the plurality of second blinds.

9. The optical path adjusting device of claim 6, wherein the driving power generating unit generates a magnetic force by being driven when an electrical signal is applied, and the driving power delivering unit is magnetic and is combined with the plurality of first blinds and the plurality of second blinds, whereby the driving power delivering unit delivers a rotation power to the plurality of first blinds and the plurality of second blinds due to the magnetic force of the driving power generating unit.

10. A photographing apparatus comprising:
    an optical path adjusting device comprising,
       a supporting plate having a hole through which light passes,
       a two-dimensional (2D) aperture disposed in the supporting plate so as to adjust an open area of the hole, and
       a three-dimensional (3D) aperture having a plurality of first blinds and a plurality of second blinds,
       wherein the plurality of first blinds are disposed to correspond to a first area of the hole so as to move to open or close the first area, and the plurality of second blinds are disposed to correspond to a second area of the hole so as to move to open or close the second area;
    an imaging device that converts light passed through the optical path adjusting device into an electrical signal; and
    a control unit that performs photographing by controlling the imaging device and the optical path adjusting device, and selects and performs one of a 2D photographing mode and a 3D photographing mode, wherein, in the 2D photographing mode, the control unit performs photographing by controlling the optical path adjusting device to open the plurality of first blinds and the plurality of second blinds of the 3D aperture and then to adjust an open area of the 2D aperture, and in the 3D photographing mode, the control unit obtains two images by controlling the optical path adjusting device to maximally open the 2D aperture and alternately open and close the plurality of first blinds and the plurality of second blinds.

* * * * *